Patented Aug. 21, 1951

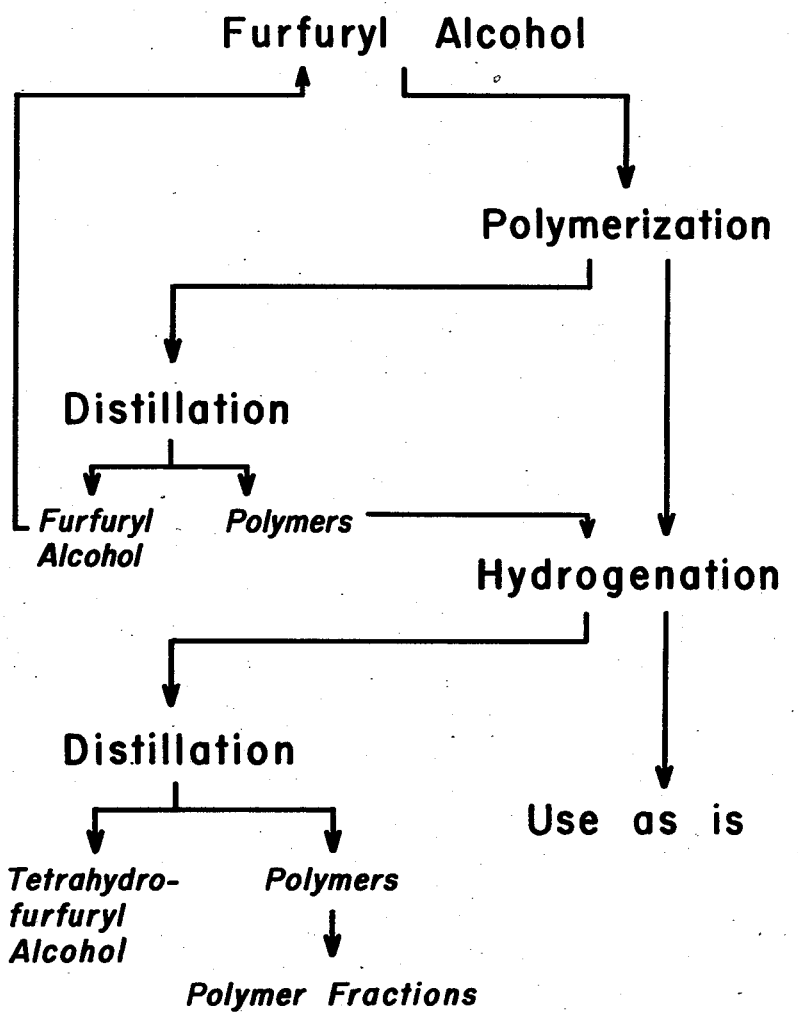

2,564,835

UNITED STATES PATENT OFFICE 2,564,835

HYDROGENATED FURFURYL ALCOHOL PARTIAL POLYMERS

Andrew P. Dunlop, Riverside, and Paul R. Stout, Chicago, Ill., assignors to The Quaker Oats Company, Chicago, Ill., a corporation of New Jersey Application May 4, 1949, Serial No. 91,316

10 Claims. (Cl. 260—88.5)

This invention relates to hydrogenated furfuryl alcohol partial polymers and to the methods of preparing the same. These hydrogenated polymers are especially adapted for use in the preparation of new synthetic resinous compositions and they are also useful as plasticizers particularly as plasticizers for furan and vinyl type resins with which they are compatible. As used herein the term furan resins applies to resins derived from furan compounds and is not to be limited to resins derived from furan itself.

Certain resins or polymers prepared from furans and from vinyl compounds possess many desirable properties including mechanical strength and chemical resistance; however, with age they tend to become brittle. To overcome this latter deficiency certain constituents called plasticizers are added. Many of these plasticizers are costly, are difficult to incorporate into the composition by milling because of incompatibility with the resin and in addition, some require a more or less extended aging period for the development of maximum plasticity. Others, even though they are sufficiently compatible initially with the resin giving rise to improved elasticity, are not suitable since the improvement obtained is lost when the resin is converted into its final state. This causes the components of the mixture to separate with consequent impairment of elastic properties.

It is an object of the present invention to provide a new class of plasticizers for furan resins and vinyl type resins which plasticizers are effective while at the same time they avoid the principal objections to the plasticizers previously available.

These and other objects are obtained by preparing plasticizers comprising hydrogenating, either completely or incompletely, a partially-polymerized furfuryl alcohol. The partially polymerized furfuryl alcohol used in the present invention is a partially resinified furfuryl alcohol of any desired viscosity short of the gel stage and may be prepared by any of the known methods; however, we prefer the methods described in our co-pending application, Serial No. 758,508 filed July 2, 1947.

Partial resinification of furfuryl alcohol, as is well known, may be effected by heat alone, catalysts alone, or by heat and catalysts. Suitable catalysts which may be used are mineral acids, organic carboxylic acids and sulfonic acids, acidic salts, or finely divided metals. Specific examples of suitable catalysts are: phosphoric acid, sulfuric acid, oxalic acid, paratoluenesulfonic acid, calcium chloride, ferric chloride, boron fluoride, iodine, etc. During resinification the furfuryl alcohol undergoes chemical and physical changes to yield a mixture of fusible condensation products.

Partial resinification of furfuryl alcohol as described above is carried out until the resulting resinous product has the desired viscosity. For example, a suitable, partially resinified, furfuryl alcohol resin formed by heat alone is obtained by refluxing furfuryl alcohol to a viscous resin having, for example, a viscosity of about 100 centipoises at 25° C. A suitable partially resinified furfuryl alcohol resin formed by the aid of a catalyst is obtained by heating furfuryl alcohol in an open vessel in the presence of phosphoric acid to a viscous resin having, for example, a viscosity of about 2,000 centipoises at 25° C. A suitable partially resinified furfuryl alcohol resin may be formed by the use of a catalyst alone by adding boron fluoride dissolved in methanol to furfuryl alcohol then allowing the resulting mixture to stand at about 20° C. until a viscous resin having, for example, a viscosity of about 1,000 centipoises at 25° C. is obtained. When a resin of the desired viscosity is obtained the catalyst is neutralized with sodium hydroxide.

We have found that these resins when hydrogenated produce plasticizers which possess many desirable qualities including compatibility with furan resins, vinyl type resins, and other resins, and they have a low melting point. Generally they are liquid or soft at low temperatures rendering them capable of being worked into resins at ordinary temperatures with conventional apparatus, and they possess a low vapor pressure.

In carrying out the present invention partially polymerized furfuryl alcohol prepared according to the method described in our co-pending application, or by any other suitable means, is hydrogenated in the presence of a catalyst. Raney nickel, platinum, or palladium, are suitable. If desired the hydrogenation may be conducted in the presence of a suitable solvent. Following hydrogenation the product and catalyst may be separated by filtration, centrifugation or decantation and any solvent used removed by evaporation or distillation.

When furfuryl alcohol is partially polymerized a complex mixture consisting of unchanged furfuryl alcohol, dimer, trimer and higher polymeric forms of furfuryl alcohol is obtained. If a product of a more or less definite molecular size is desired the mixture of polymers obtained in accordance with the method herein described can be separated into appropriate fractions by fractional distillation, preferably under reduced pressure. Since molecular size and compatibility are related to a certain extent, fractionation makes it possible to select a fraction which has the desired compatibility with the resin used. A plasticizer consisting of large molecular size polymers possesses a low vapor pressure, consequently for some uses such a fraction is particularly desirable. As one example, such a plasticizer is preferred when used in thin films thus avoiding execessive losses therefrom through evaporation.

In addition to separating the mixture into fractions according to molecular size we have found it possible to prepare a colorless or nearly colorless plasticizer by a process involving fractional distillation. For best results the mixture should be distilled under vacuum. The distillate so obtained is hydrogenated and then redistilled under vacuum. If a small amount of color can be tolerated the first distillation step may be eliminated.

The figure is a flow sheet of the polymerization-hydrogenation process. An inspection of this diagram discloses that the process may be varied in that the polymerized product may be hydrogenated immediately after polymerization and then distilled or the distillation may precede the hydrogenation step. For practical reasons, the latter method is preferred because the removal of unchanged furfuryl alcohol from the mixture permits the hydrogenation of a greater quantity of partial polymer per charge and the recovered furfuryl alcohol can be returned to the polymerization step. Furthermore, if this furfuryl alcohol is not removed it will be reduced to tetrahydrofurfuryl alcohol during the hydrogenation step and since for most purposes a hydrogenated polymer free of tetrahydrofurfuryl alcohol is preferable, distillation will be necessary eventually.

The plasticizers of the present invention are especially effective when used with furan resins, vinyl type resins, etc. The amount of the plasticizer used may vary widely being generally between about 5% or even less to about 50% based upon the weight of the resin and will be governed by the properties desired to be imparted to the resinous compositions.

In order to disclose the nature of the present invention still more clearly, the following illustrative examples will be given. It is to be understood that the invention is not to be limited to the specific conditions or details set forth in these examples except insofar as such limitations are specified in the appended claims. Parts given are parts by weight.

*Example 1*

A mixture of 347 parts of a furfuryl alcohol acid-catalyzed partial polymer, the pH of which had been adjusted to 8 with sodium hydroxide and having a viscosity of about 2000 centipoises at 25° C., 52 parts of Raney nickel catalyst and 152 parts of isopropyl alcohol was hydrogenated at 190-205° C. and a pressure of 1000-1700 pounds per square inch. 13.6 parts of hydrogen was taken up in 4½ hours. Since the starting material contained 17% water, this represented hydrogenation of somewhat less than 85% of the furanoid unsaturation originally present in the polymer. After removing the catalyst by filtration and the solvent by vacuum distillation, a liquid was recovered which had a viscosity approximately equal to that of the starting material and possessed a green-red dichroism.

*Example 2*

A mixture of 303 parts of a furfuryl alcohol acid-catalyzed polymer having a pH of 6.3, moisture 6% and a viscosity of about 1300 centipoises at 25° C., 30 parts of Raney nickel catalyst and 280 parts of isopropyl alcohol was hydrogenated at 190°-225° C. and a pressure of 1400-1600 pounds per square inch. 5.8 parts of hydrogen was taken up in two hours which represented hydrogenation of somewhat less than 49 percent of the furanoid unsaturation originally present in the polymer.

*Example 3*

In this example various mixtures which had been prepared containing 17-70 percent of the hydrogenated product of Example 1 and the remainder being the starting material of Example 1 were cured at 180° C. in the absence of any added catalyst. The flexibility of the cured product varied directly with the amount of hydrogenated product added. All cured samples were insoluble in cold aqueous sodium hydroxide, ethyl ether and carbon tetrachloride.

*Example 4*

A mixture of 840 parts of a furfuryl alcohol acid-catalyzed partial polymer, the pH of which had been adjusted to 6.5 with triethanolamine, moisture of 10 percent, and having a viscosity of about 2000 centipoises at 25° C., and 114 parts of Raney nickel catalyst was hydrogenated at 205°-215° C. and a pressure of 1200-1500 pounds per square inch. 34 parts of hydrogen was taken up in about 7 hours which was sufficient to hydrogenate substantially completely the furanoid unsaturation originally present in the polymer.

*Example 5*

A portion of the product of Example 1 was distilled under vacuum to give 65 percent distillate and still bottoms of 35 percent. The distillate was then fractionally distilled under a vacuum (4 mm. pressure) giving 26 percent tetrahydrofurfuryl alcohol and the following fractions:

| Boiling point in °C. at 4 mm. | Yield in percent |
|---|---|
| 60-90 | 6 |
| 125-150 | 14 |
| 150-180 | 8 |
| 180-200 | 12 |
| 200-220 | 3 |
| 220-245 | 8 |

We have found that improved resins may be obtained by condensing an incompletely hydrogenated partially-resinified-furfuryl alcohol with itself or with a thermoplastic resin such as those derived from the following products: furfuryl alcohol, furfuryl alcohol-dimethylolurea, furfuryl alcohol-phenol-formaldehyde, furfuryl alcohol-melamine-aldehyde, furfuryl alcohol-ammonium thiocyanate-aldehyde, alkylfurans, unsaturated furyl aldehydes, furfural-phenol, vinyl type compounds, ureaformaldehyde, malamineformaldehyde, etc. This condensation can be effected by the use of heat alone, an acidic catalyst alone or by heat and an acidic catalyst. The resultant resins combine strength, toughness, elasticity, flexibility, adhesiveness, and high chemical resistance with excellent insulating properties which are highly desirable in compositions used as insulating enamels for coating electrical conductors. As an example a wire enamel may be prepared consisting of an incompletely hydrogenated partially resinified furfuryl alcohol, a fatty acid modified alkyd resin such as glyceryl phthalate modified with linseed fatty acids and a suitable solvent such as acetone, ethyl acetate, benzene, etc. A typical formulation is as follows: hydrogenated furfuryl alcohol polymer 1 part, modified alkyd resin 1 part, and acetone 2 parts. The nature of this condensation reaction is rather obscure but a theory of explanations is as follows: an incompletely hydrogenated partial polymer will possess unsaturated bonds and because of those bonds the polymer can condense with itself or copolymerize through cross linkage with other polymerizable resins particularly furan resins.

*Example 6*

A mixture of 773 parts of a furfuryl alcohol acid-catalyzed partial polymer which had been neutralized, dehydrated under vacuum, and having a viscosity of about 2000 centipoises at 25° C., 80 parts of Raney nickel catalyst and 20 parts of isopropyl alcohol was hydrogenated at 170–200° C. and a pressure of 1000–1800 pounds per square inch. 8.6 parts of hydrogen was taken up in 6 hours which was sufficient to hydrogenate about 25 percent of the furanoid unsaturation originally present in the polymer.

*Example 7*

Since the stroke cure is a measure of the thermo-setting properties of a resin, the following resins were so tested: An acid-catalyzed furfuryl alcohol partial polymer having a viscosity of about 2000 centipoises of 25° C., resin of Example 6 and the resin of Example 4. The stroke cure has been defined as the time in seconds required for a resin to convert from a fusible or liquid condition at a definite temperature while being stroked with a spatula to a condition at which the spatula either no longer sticks to the resin or slides over it with relative ease. In practice about 2 cc. of the resin is placed on a hot plate, the temperature of which is adjusted to 145°–150° C., and stroked approximately 90–100 strokes per minute) with the flat side of a spatula to smooth the resin into a square 2 to 3 inches on a side.

None of the foregoing resins gave a stroke cure in ten minutes in the absence of a catalyst and in addition it was impossible to obtain a stroke cure in ten minutes on the resin of Example 4 in the presence of a catalyst. The stroke cures obtained on the resins in the presence of a catalyst are summarized below.

| Catalyst, parts per part of resin | Stroke cure in seconds | |
|---|---|---|
| | Furfuryl alcohol Partial polymer | Resin, Example 6 |
| Maleic acid _____ 0.05 | 38 | 160 |
| Phosphoric acid _____ 0.001 | 90 | 540 |
| Phosphoric acid _____ 0.04 | | 80 |

*Example 8*

These hydrogenated furfuryl alcohol partial polymers are also effective to impart increased flexibility and adherence to other resins, e. g., a furfurylated dimethylolurea resin such as described in Example 1 of the Dunlop copending application Serial Number 586,631 filed April 4, 1945, and a furfural-phenol resin such as prepared according to the method described in U. S. Patent 1,969,890. In these tests, a mixture consisting of 1 part of resin Example 6, 1 part furfurylated dimethylolurea resin and 0.02 part phosphoric acid was heated for 1 hour at 160° C. In another test, a mixture consisting of 1 part of resin Example 6, 1 part of furfural-phenol resin and 0.02 part phosphoric acid was heated for 1 hour at 160° C. In both examples, the resulting resins possessed good adhesion, toughness, flexibility and resistance to solvents.

The resins of Example 4 and Example 6 were added to the resinous materials listed below to determine their compatibility with those resins. In these tests equal quantities of the hydrogenated furfuryl alcohol polymer and the resinous material were mixed and gently heated. The following resinous materials were found to be compatible with both hydrogenated polymers: cellulose acetate-butyrate, cellulose nitrate, ethyl cellulose, furfural-phenol resin of Example 8, furfuryl alcohol-ammonium thiocyanate prepared according to Example 2 of the U. S. Patent 2,368,426, furfurylated dimethylolurea of Example 8, methylfuran polymer prepared according to Example 5 of our copending application Serial Number 621,592 filed October 10, 1945, now Patent 2,486,392, granted November 1, 1949, methyl methacrylate, phenol-formaldehyde laminating varnish, vinyl acetate and vinyl butyral. Resinous materials such as cellulose acetate, nylon, styrene, vinyl chloride, vinyl chloride-acetate and vinyl-vinylidene chloride exhibited only limited compatibility with the hydrogenated polymers. Polyethylene is an example of a resinous material which is incompatible with the hydrogenated polymers.

Having now described and illustrated our invention, we wish it to be understood that our invention is not to be limited to the specific details herein described, except insofar as such limitations are specified in the appended claims.

We claim:

1. A process of producing a composition of matter which comprises the hydrogenation of a partially resinified furfuryl alcohol.

2. A process of producing a composition of matter which comprises the hydrogenation of an acid-catalyzed partially resinified furfuryl alcohol.

3. A process of producing a composition of matter which comprises the hydrogenation of a partially resinified furfuryl alcohol at a temperature of 170–225° C. and a pressure of 1000–1800 pounds per square inch.

4. A process of producing a new thermosetting artificial resin which comprises heating an incompletely hydrogenated partially resinified furfuryl alcohol.

5. A process of producing a new thermosetting artificial resin which comprises heating an incompletely hydrogenated partially resinified furfuryl alcohol in the presence of an acidic catalyst.

6. A process of producing a new plasticizer which comprises the hydrogenation of a liquid partially resinified furfuryl alcohol.

7. As a composition of matter a partially polymerized furfuryl alcohol having a viscosity of 100–80,000 centipoises at 25° C. and wherein at least 25 per cent of the unsaturation of said partially polymerized furfuryl alcohol has been saturated with hydrogen.

8. As a composition of matter a partially polymerized furfuryl alcohol having a viscosity of 100–80,000 centipoises at 25° C. and wherein 25 to 85 per cent of the unsaturation of said partially polymerized furfuryl alcohol has been saturated with hydrogen.

9. As a composition of matter a partially polymerized furfuryl alcohol having a viscosity of 1000–2000 centipoises at 25° C. and wherein at least 25 per cent of the unsaturation of said partially polymerized furfuryl alcohol has been saturated with hydrogen.

10. As a composition of matter a partially polymerized furfuryl alcohol having a viscosity of 1000–2000 centipoises at 25° C. and wherein 25 to 85 per cent of the unsaturation of said partially polymerized furfuryl alcohol has been saturated with hydrogen.

ANDREW P. DUNLOP.
PAUL R. STOUT.

REFERENCES CITED

The following references are of record in the file of this patent:

UNITED STATES PATENTS

| Number | Name | Date |
|---|---|---|
| 1,780,652 | Lawson | Nov. 4, 1930 |
| 2,345,966 | Fielder | Apr. 4, 1944 |